United States Patent [19]

Stenger et al.

[11] 3,775,975
[45] Dec. 4, 1973

[54] FUEL DISTRIBUTION SYSTEM
[75] Inventors: Richard E. Stenger, Cincinnati; John M. Richey, Fairfield, both of Ohio
[73] Assignee: General Electric Company, Cincinnati, Ohio
[22] Filed: Sept. 5, 1972
[21] Appl. No.: 286,433

[52] U.S. Cl. .......................... 60/39.32, 60/39.74 R
[51] Int. Cl. ......................... F02c 7/20, F02c 7/22
[58] Field of Search .................. 60/39.74 R, 39.32, 60/262, 226 R

[56] References Cited
UNITED STATES PATENTS
3,335,567 8/1967 Hemsworth ................. 60/39.74 R
3,516,252 6/1970 Udell et al. ................. 60/39.74 R
2,969,925 1/1961 Burgess et al. ............. 60/39.74 R
3,528,250 9/1970 Johnson ...................... 60/262 X
3,295,318 1/1967 Bauger et al. .............. 60/39.32 X

*Primary Examiner*—Carlton R. Croyle
*Assistant Examiner*—Robert E. Garrett
*Attorney*—Derek P. Lawrence et al.

[57] ABSTRACT

A fuel distribution system for accurately metering the amount of fuel delivered to each of a plurality of fuel injection points associated with a gas turbine engine is shown to include a fuel manifold surrounding and separated radially from the engine casing by a number of hinge-type mounts. A plurality of metering valve housings are mounted directly to the fuel manifold, and a fuel distribution valve is contained within each housing. Fuel is delivered from each housing to an appropriate point on the engine casing via a single pigtail-type fuel delivery tube. Individual tubes and valves and sectors of the fuel manifold are removable without tearing down the entire fuel distribution assembly.

8 Claims, 3 Drawing Figures

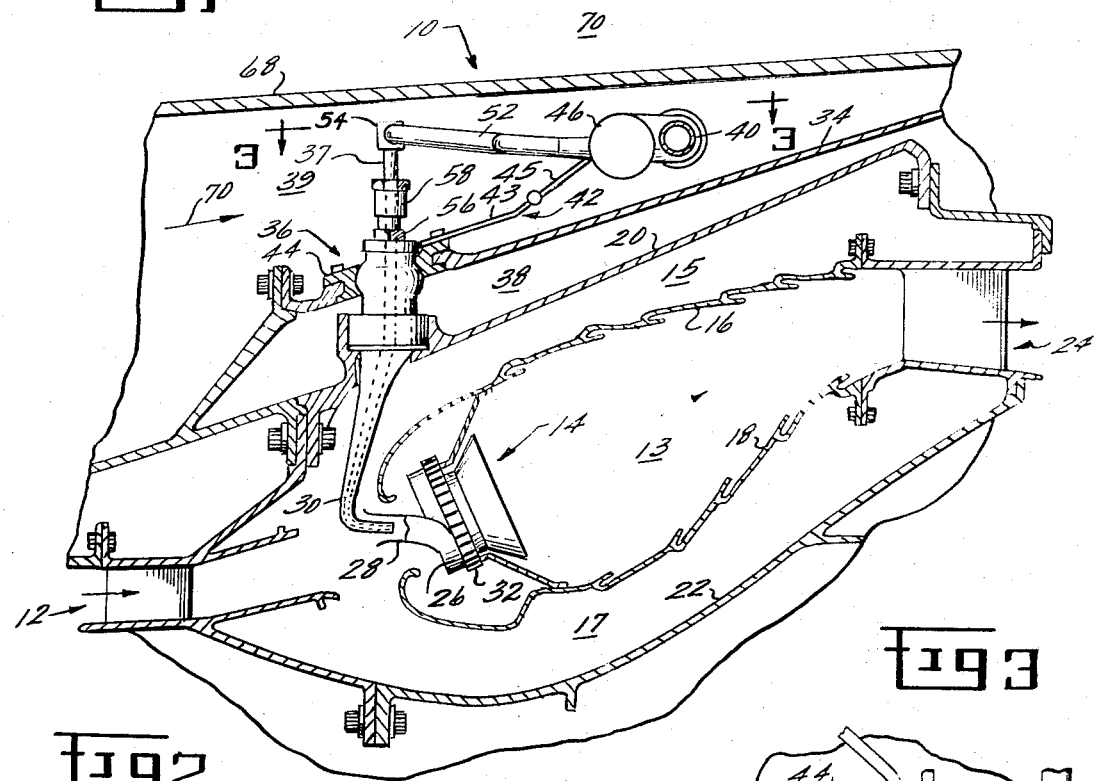
Fig 1
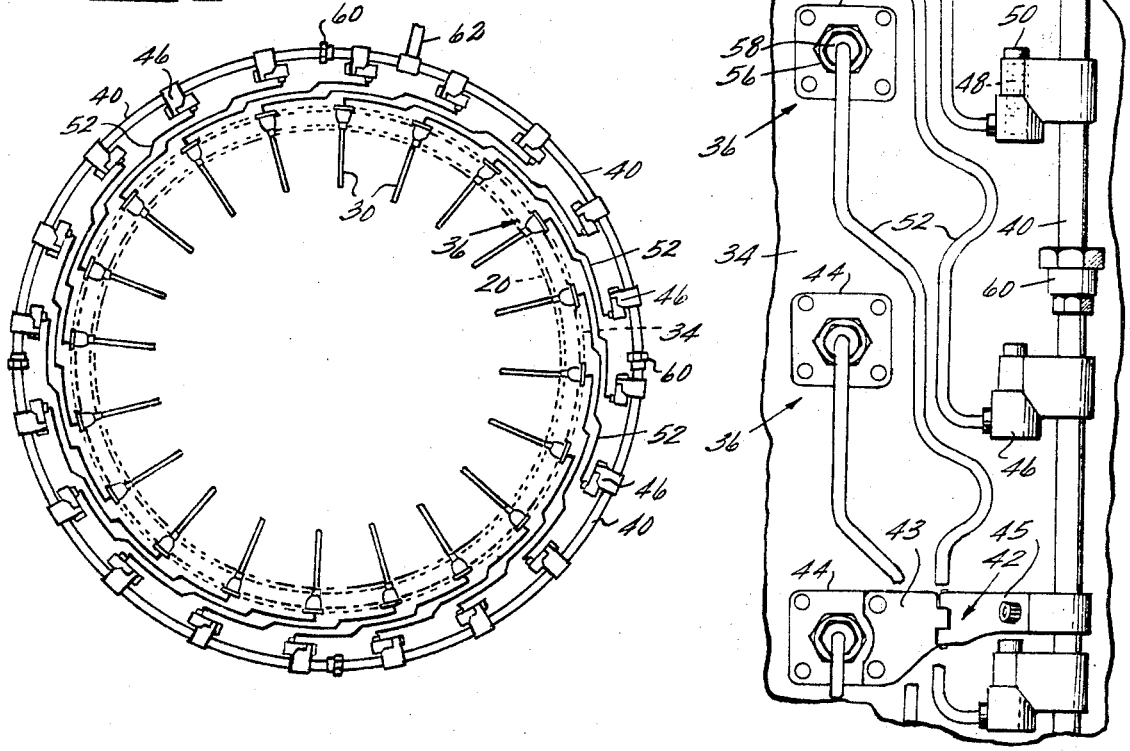
Fig 2
Fig 3

FUEL DISTRIBUTION SYSTEM

GAS TURBINE ENGINE FUEL DISTRIBUTION SYSTEM

BACKGROUND OF THE INVENTION

This invention relates primarily to improvements in fuel delivery systems employing a plurality of fuel injection points.

The invention herein described was made in the course of or under a contract, or a subcontract thereunder, with the United States Department of the Air Force.

The present invention is best understood by referring to its motivating environment, namely, gas turbine engines which are widely used both in the propulsion of aircraft and in many land based operations. Such engines basically comprise an axial flow compressor which compresses air for combustion with fuel in an annular combustor. The products of combustion initially drive a turbine that powers the compressor and are then directed through a discharge nozzle to obtain a propulsive jet force for aircraft applications, or shaft power. In this and other engines where the combustor is in the form of an annulus, a plurality of fuel injection points is provided therearound so that substantially uniform combustion exists in the combustor.

In most present-day gas turbine engine applications, fuel is introduced into the combustor in one of two manners. That is, fuel is introduced into the combustor either through a relatively high pressure atomizing nozzle or by means of a relatively low pressure carbureting injector. In either case, the amount of fuel injected into the combustor is normally controlled by individual fuel distribution valves associated with each fuel injection point. Because of the tremendous interest in providing smokeless and pollutant-free gas turbine engines, and because gas turbine engines operate over a very wide range of power demands, these individual distribution valves must be capable of providing uniform metering of fuel to each injection point over a wide range of flows. Of necessity, the valves must be mounted close to the fuel injection point in order to maintain external tubing at a minimum.

Common practice has been to mount the valve directly to the engine casing at each fuel injection point. In such a system, fuel is supplied to each valve from a fuel manifold via a "pigtail" delivery tube. The pigtail is provided to substantially reduce thermal and vibratory stresses in the high pressure tubing during operation of the engine. Problems with fuel decomposition have been encountered in these valves which are bolted directly to the hot engine casing. This causes the nozzle tip to plug with carbon and has an adverse effect on performance. A major increase in the reliability of the parts will result if the valve is mounted away from the casing where lower temperatures exist. Such a system, however, must be compact, lightweight, and easily maintainable. That is, in the event of a malfunction, the valves and their associated tubing must be easily removed and replaced without the necessity of removing the entire fuel manifold system.

A further requirement of any such mounting system is that the fuel manifold and distribution system be capable of providing short engine lightoff times. That is, the fuel distribution system must be capable of providing sufficient amounts of fuel at a plurality of fuel injection points to permit lightoff and idle engine operation within a few seconds after ignition is called for by an operator. With prior fuel distribution systems it was common practice to provide a pressurizing valve, which controlled the flow at each fuel injection point, and a drain valve, which drained the fuel distribution system upon engine shutdown. This prevented fuel decomposition from thermal "soakback" and prevented fuel from slowly dripping into the engine. However, start-up of engines including such a fuel distribution system could not be accomplished until the entire fuel distribution system, or a significant part thereof, was provided with fuel. A fuel distribution system which does not have to be drained after engine shutdown could significantly reduce engine start-up time.

SUMMARY OF THE INVENTION

It is an object of this invention, therefore, to provide a gas turbine engine fuel distribution system in which the flow divider valves are mounted away from the engine casing such that heat "soakback" to the fuel from the hot casing is minimized. It is a further object of this invention to provide such a system in which engine start-up times are significantly reduced because the fuel distribution system is constantly maintained full of fuel.

Briefly stated, the above and similarly related objects are attained by providing a gas turbine engine fuel distribution system in which flow divider valves associated with each fuel injection point are formed integrally with a fuel manifold which extends around the engine casing and is separated therefrom. The manifold is hinge-mounted to the engine casing, and a single pigtail flow tube extends from each flow divider valve to its associated fuel injection point. A high temperature gas sealing device is provided at each fuel injection point on the engine casing, and the entire flow distribution system is located in a cavity which is capable of being bathed in relatively low temperature air. The flow divider valves fit within cylindrical housings formed integrally with the fuel manifold and are capable of being individually replaced without affecting any other portion of the fuel distribution system. Similarly, the fuel manifold, flow divider valves, and associated tubing are all formed in sectors, any one of which is capable of being replaced without removing the remaining portions of the fuel distribution system.

DESCRIPTION OF THE DRAWINGS

While the specification concludes with a set of claims which particularly point out and distinctly claim the subject matter which Applicants regard to be their invention, the invention will be clearly understood from the following detailed description, which is given in connection with the accompanying drawings, in which:

FIG. 1 is a fragmentary, longitudinal section of a gas turbine engine embodying the present invention;

FIG. 2 is a schematic illustration of the invention; and

FIG. 3 is a top plan view, on an enlarged scale, taken generally along line 3—3 of FIG. 1.

DESCRIPTION OF A PREFERRED EMBODIMENT

Referring now to the drawings wherein like numerals correspond to like elements throughout, attention is directed initially to FIG. 1 wherein a fuel distribution system constructed in accordance with the present invention is generally designated by the numeral 10. The fuel distribution system 10 is most particularly adapted for use with a gas turbine engine, as indicated by the fragmentary representation thereof in FIG. 1. In such engines, air is compressed by a compressor, the final stage of which is indicated at 12. A portion of the air exiting from the compressor enters an annular combustor 13 for reaction with fuel delivered by a plurality of fuel/air carbureting devices 14. The remainder of the air, among other things, serves as a cooling agent and passes on opposite sides of the combustor 13 through passageways 15 and 17 defined by a pair of combustor liners 16 and 18, a combustor casing 20, and an inner casing 22. The products of combustion are discharged from the combustor 13 through a turbine stator 24 and are employed in known fashion to drive the compressor 12 and then to generate a power output, such as a propulsive jet force, or shaft power.

The plurality of fuel/air carbureting devices 14 are equally spaced in a circle about the annular combustor 13 (see the schematic showing of FIG. 2) to maintain substantially uniform temperature within the combustor 13. As shown in FIG. 1, the fuel/air carbureting device consists of a carburetor 26 having an inlet 28 to which is delivered low pressure fuel through a fuel inlet tube 30. Air also enters the carbureting device 14 through the inlet 28 and also through a secondary swirler 32, and a fuel/air mixture is discharged as a vortical efflux from the carbureting device 14 in a generally known manner.

The inner fuel delivery tubes 30 are supported by the combustor casing 20 and by an outer engine casing 34 by means of a suitable high temperature gas seal assembly and fitting 36. Suffice it to say that the seal/fitting 36 includes an outer radial tube 37 which delivers fuel to the inner tubes 30 and further provides a suitable seal between the relatively high pressure, high temperature passageway 15 and an annular passage 38 formed between the combustor casing 20 and the engine casing 34, and between the annular passage 38 and an annular chamber 39 in which is located the fuel distribution system 10.

The amount of fuel to be delivered to the combustor 13 by the carbureting device 14 varies widely for different engine operating conditions. The total amount of fuel flow which is delivered to the combustor 13 to provide desired engine operation is normally controlled by a main fuel control (not shown). The primary subject matter of this invention consists of the manner in which the total amount of fuel flow which is delivered by the main fuel control is provided to each individual fuel injection point. That is, the present invention consists of a fuel distribution system which includes a fuel manifold 40, which surrounds the engine outer casing 34 and is spaced radially outwardly thereof, i.e., separated therefrom by some radial distance. As shown in FIGS. 1 and 3, the manifold 40 is mounted to the engine casing 34 by means of a plurality of hinge mounts 42, each of which has a first end member 43 mounted to a mounting block 44 formed integrally with the casing 34 and a second end member 45 which surrounds and supports the manifold 40 in any suitable manner. The hinge mounts 42 permit relative thermal expansion to occur between the engine casing 34 and the fuel manifold 40 during operation of the gas turbine engine. Formed integrally with and equally spaced around the fuel manifold 40 are a plurality of flow divider valve housings 46, each of which contain a flow divider valve 48, one of which is shown in phantom in FIG. 3. The internal structure of the valve 48 forms no part of the present invention, but one unique feature of the assembly is that any one of the valves 48 may be removed from its valve housing 46 merely by removing an end cap 50, which is attached to one end of the housing 46 in any suitable manner, such as by a threaded connection or by welding.

As is shown most clearly in FIG. 3, a single pigtail tube 52 extends from each of the valve housings 46 to an enlarged fitting 54 provided at the outer end of each of the radial tubes 37. At this point, a suitable sealed connection is made between the pigtail tube 52 and the radial tube 37. As further shown, each of the radial tubes 37 is connected to a fitting 56 which forms one end of the fuel tube 30, which extends through the sealing mechanism 36. The radial tube 37 is rigidly connected to the fitting 56 in any suitable manner, such as by means of a nut 58. When thus connected, the pigtail tubes 52 and the tubes 37 act to deliver fuel from the fuel manifold 40 to each of the fuel tubes 30 from which it is delivered to the fuel/air carbureting devices 14. It will be seen from FIGS. 1 and 3 that the pigtail tubes 52 are formed with a series of bends to accommodate differential expansion between the manifold 40 and the engine casing 34 and to allow for other penetration of the casing. All of the pigtail tubes 52 are identical and interchangeable in the present system.

As shown most clearly in FIG. 2, the fuel manifold 40 is constructed in a number of segments, e.g., four segments, each end of which is provided with a suitable fitting 60 by which the segments may be interconnected. At least one of these segments has associated therewith an inlet tube 62 which is connected to a suitable source of fuel (not shown).

As shown in FIG. 1, the entire fuel distribution system lies within the annular chamber 39 formed between the engine casing 34 and a fan duct 68, which forms the inner bounds of a fan flow path 70 associated with the gas turbine engine. During operation of the engine, the annular chamber 39 is bathed with relatively cool air which is bled from the fan flow path 70. In this manner, the entire fuel distribution system is maintained at temperatures which are conducive to long life and reliable operation. In addition, should a fuel leak develop in any portion of the fuel distribution system, the leaking fuel is entrained in the air flow through the annular chamber 39 and is dumped overboard at some downstream location. Further, the pigtail is downstream of the flow divider distribution system and, therefore, if a leak develops in this system, the fuel loss will be small when compared to present systems where the pigtail is upstream of the system restriction.

Since the fuel distribution system is separated from the higher temperature engine casing and is connected to the casing only at locations where relatively low pressure fuel is being injected into the combustor, the entire fuel distribution system is maintained at much lower temperatures and stress levels than those of previous designs. For this reason, the common practice of draining the entire fuel distribution system upon shutting down the engine may be discontinued. That is, in prior systems the fuel was drained from the pigtail tubes and fuel manifold by means of a pressurizing and drain valve which was mounted externally to the engine. In restarting the engine, the pressurizing and drain valve was utilized to initially "charge" the entire fuel distribution system with fuel prior to activation of the ignition system. Such system may result in uneven introduction of fuel during the starting cycle while the manifold is being purged of air. With the present inventive fuel distribution system, the need for a pressurizing and drain valve no longer exists because fuel can be maintained in the fuel manifold 40 at all times. Because of this feature, start-up times associated with the engine may be substantially reduced, plus fuel introduction at starting is more uniform. In addition, the pressurizing function is now completely contained in the fuel metering control (not shown) rather than in a separate component.

In normal operation, fuel is delivered to the fuel manifold 40 via the inlet tube 62 from a suitable supply of fuel (not shown). The fuel then flows through and is controlled by the individual flow divider valves 48, which are located within the flow divider valve housings 46. The flow divider valves 48 deliver the required amounts of fuel via the pigtail tubes 52 and the radial tubes 37 to the fuel delivery tubes 30. The fuel then flows through the fuel delivery tubes 30 to the fuel carbureting devices 14, in which it is mixed with a required amount of carbureting air and injected into the combustor 13. The fuel/air mixture is then ignited by means of a suitable igniter (not shown) and the resultant high temperature gas products exit the combustor through the turbine stator 24 in a well-known manner.

Modifications of the preferred embodiment herein described will occur to those skilled in the art within the spirit and scope of the invention which is to be derived solely from the appended claims.

Having thus described the invention, what is claimed as novel and desired to be secured by Letters Patent of the United States is:

1. In a gas turbine engine of the type which includes a compressor, a combustion system, a turbine for driving the compressor, an external engine casing surrounding the combustion system, and a plurality of fuel/air carbureting devices for injecting a fuel/air mixture into the combustion system, the improvement comprising:
 a fuel distribution system for delivering fuel to the plurality of fuel/air carbureting devices consisting of a fuel manifold which surrounds the outer engine casing and is separated radially therefrom, at least one flow divider valve housing mounted directly to said fuel manifold, valving means associated with said housing, means for delivering fuel from said housing to at least one of said fuel/air carbureting devices, means for delivering fuel to said fuel manifold, and means for mounting said fuel manifold to the engine casing.

2. The improved fuel delivery system recited in claim 1 further characterized in that a plurality of said valve housings are mounted directly to said fuel manifold.

3. The improved fuel delivery system recited in claim 2 wherein said valve housings are substantially equally spaced around the circumference of said fuel manifold.

4. The improved fuel delivery system recited in claim 2 wherein said means for delivering fuel from said housings to said fuel/air carbureting devices includes a single pigtail tube extending from each of said housings.

5. The improved fuel distribution system recited in claim 4 wherein each said flow divider valve housing comprises a generally cylindrical-shaped container rigidly connected to said fuel manifold, and each of said containers includes a removable end cap.

6. The improved fuel distribution system recited in claim 5 further characterized in that the fuel distribution system lies entirely within an annular cavity, said cavity being supplied with cooling air.

7. The improved fuel distribution system recited in claim 6 wherein said cavity is formed by the outer engine casing and a fan casing.

8. The improved fuel distribution system recited in claim 7 wherein said means for mounting said fuel manifold comprise a plurality of hinge-type mounts.

* * * * *